(12) United States Patent
Dillmann et al.

(10) Patent No.: US 9,196,936 B2
(45) Date of Patent: Nov. 24, 2015

(54) STORAGE UNIT FOR STORING ELECTRICAL ENERGY WITH A HEAT PIPE

(75) Inventors: Adolf Dillmann, Muensingen (DE); Stefan Huehner, Kusterdingen (DE); Reiner Holp, Winterlingen (DE)

(73) Assignee: Robert Bosch GmbH, Stuttgart (DE)

( * ) Notice: Subject to any disclaimer, the term of this patent is extended or adjusted under 35 U.S.C. 154(b) by 51 days.

(21) Appl. No.: 14/128,762

(22) PCT Filed: May 30, 2012

(86) PCT No.: PCT/EP2012/060154
§ 371 (c)(1),
(2), (4) Date: Dec. 23, 2013

(87) PCT Pub. No.: WO2012/175300
PCT Pub. Date: Dec. 27, 2012

(65) Prior Publication Data
US 2014/0154548 A1 Jun. 5, 2014

(30) Foreign Application Priority Data
Jun. 21, 2011 (DE) .......................... 10 2011 077 924

(51) Int. Cl.
H01M 10/50 (2006.01)
H01M 10/613 (2014.01)
H01G 9/15 (2006.01)
H01G 11/08 (2013.01)
H01M 10/6552 (2014.01)
H01M 2/10 (2006.01)
F28D 15/02 (2006.01)

(52) U.S. Cl.
CPC ........... *H01M 10/5004* (2013.01); *H01G 9/151* (2013.01); *H01G 11/08* (2013.01); *H01M 10/613* (2015.04); *H01M 10/6552* (2015.04); *F28D 15/0275* (2013.01); *H01M 2/1016* (2013.01); *H01M 2/1061* (2013.01)

(58) Field of Classification Search
CPC .......................... H01M 2/1016; H01M 2/1061
See application file for complete search history.

(56) References Cited

U.S. PATENT DOCUMENTS

| 6,392,387 B1 | 5/2002 | Sage et al. |
| 2003/0017383 A1 | 1/2003 | Ura et al. |
| 2004/0232891 A1 | 11/2004 | Kimoto et al. |
| 2008/0292949 A1 | 11/2008 | Shen et al. |
| 2009/0141419 A1 | 6/2009 | Pal et al. |
| 2009/0208829 A1 | 8/2009 | Howard et al. |
| 2011/0074362 A1 | 3/2011 | Midorikawa |
| 2011/0117410 A1 | 5/2011 | Yoon |
| 2011/0287285 A1 | 11/2011 | Yoon |
| 2012/0049788 A1 | 3/2012 | Kim et al. |

FOREIGN PATENT DOCUMENTS

| CN | 101047273 | 10/2007 |
| DE | 10139050 | 2/2003 |

(Continued)

OTHER PUBLICATIONS

International Search Report for Application No. PCT/EP2012/060154 dated Sep. 12, 2012 (3 pages).

*Primary Examiner* — Jane Rhee
(74) *Attorney, Agent, or Firm* — Michael Best & Friedrich LLP

(57) ABSTRACT

The invention relates to a storage unit (1) for storing electrical energy. The storage unit (1) has at least one energy store (3, 5, 6, 7). According to the invention, the storage unit (1) also has a contact area for giving off heat to a heat sink (45). The storage unit (1) has at least one heat pipe (50), which is connected to the contact area and is connected to the energy store (3, 5, 6, 7) in such a way that heat dissipated inside the energy store (3, 5, 6, 7) can be carried away to the contact area via the heat pipe (50).

12 Claims, 3 Drawing Sheets

(56) References Cited

FOREIGN PATENT DOCUMENTS

| | | |
|---|---|---|
| DE | 10259119 | 7/2004 |
| DE | 102005017057 | 10/2006 |
| DE | 102007045182 | 4/2009 |
| DE | 102008002103 | 12/2009 |
| DE | 102008054958 | 7/2010 |
| DE | 102010044999 | 3/2012 |
| JP | 9298070 | 11/1997 |
| JP | 2002134177 | 5/2002 |
| JP | 2003197277 | 7/2003 |
| JP | 2009277561 | 11/2009 |
| KR | 20100131694 | 12/2010 |

STORAGE UNIT FOR STORING ELECTRICAL ENERGY WITH A HEAT PIPE

BACKGROUND OF THE INVENTION

The invention relates to a storage unit for storing electrical energy. The storage unit comprises at least one energy store.

The storage unit also comprises in accordance with the invention a contact area for dissipating heat to a heat sink. The storage unit comprises at least one heat pipe that is connected to the contact area and is connected to the energy store in such a manner that heat losses that are generated inside the energy store can be dissipated to the contact area by way of the heat pipe.

More heat can be advantageously dissipated from the energy store to the heat sink by means of the heat pipe than, for example, by means of a metal heat conductor, as the heat pipe comprises considerably greater heat conducting properties in comparison to a metallic heat conductor.

The contact area for dissipating heat can be, for example, a component of a cooling element, in particular a metal block, which comprises the contact area for dissipating heat to the heat sink. The cooling element can be connected, for example, to the heat pipe, in particular in the region of an end of the heat pipe.

In a preferred embodiment, the storage unit comprises at least two energy stores. The energy stores are spaced apart from one another by way of an intermediate space, it is further preferred that they are adjacent to one another. The heat pipe is connected to the energy store by way of at least one heat conductor, wherein the heat conductor is arranged in the intermediate space. The heat conductor is preferably in operative contact with at least one energy store that is bordered by the intermediate space. The heat conductor is embodied, by way of example, as a heat conducting plate or a heat conducting block. The plate is by way of example a metal plate, the block is by way of example a metal block.

With the arrangement embodied in this manner, heat can be advantageously dissipated from a hot spot of the energy store in particular from a hotspot of a combination of the adjacently arranged energy stores.

In a preferred embodiment, the heat conductor in particular the plate that is arranged in the intermediate space is embodied in a resilient manner. As a consequence, in the case of a heat-related linear expansion of the energy store along a longitudinal axis of the energy store, heat can be dissipated by way of the heat pipe and the linear expansion of the energy store during heating is compensated for by means of the resilient characteristic of the heat conductor. The heat conductor can be embodied in this embodiment as a resiliently embodied heat conductor, for example, by way of two plates that are arranged in a parallel manner with respect to each other and are mutually connected by way of a leaf spring along the longitudinal direction, wherein the leaf spring is arranged in the intermediate space between the plates that are arranged in a parallel manner.

In a preferred embodiment, at least one electrical connector of the energy store is connected to an electrical contact rail. The electrical contact rail is connected to at least one external electrical connector of the storage unit.

The storage unit is preferably embodied for the purpose of being connected by way of the external electrical connector to a further electrical device, for example to a traction battery or an inverter. The contact rail is connected in a heat conducting manner to the contact area, preferably to the cooling element. Thus, in addition to the heat dissipation from the hotspot by way of the heat pipe, heat from the interior of the energy store can be advantageously dissipated by way of the electrical connectors of the energy store.

The electrical connectors of the energy store are embodied, for example, in each case by way of an electrically conductive layer, in particular a Schoop layer.

In a preferred embodiment, the storage unit comprises a heat conductive cooling element already mentioned previously. The cooling element comprises an externally directed surface region that embodies the contact area.

In a preferred embodiment, the energy store is a capacitor. The capacitor is, for example, a rolled-type capacitor or a super capacitor. It is preferred that electrical connectors of the energy store are embodied by way of an electrically conductive layer, in particular a Schoop layer.

The energy store in a different embodiment is a battery. The battery is, for example, a nickel metal hydride battery, a lead acid battery, a lithium ion battery, a lithium polymer battery or a lithium iron phosphate battery, which can be advantageously quickly charged with large currents and discharged.

A combination of individually different energy stores that are components of the storage unit is also feasible. By way of example, the storage unit can comprise at least one battery as an energy store and at least one capacitor as an energy store.

In a preferred embodiment, the electrical connector of the energy store, in particular the electrically conductive layer, is connected to the contact rail in an electrical and heat conducting manner. For this purpose, the contact rail can be connected to the electrically conductive layer for example by means of at least one welded connection or a soldered connection.

It is preferred that the heat pipe is embodied to absorb heat in the region of one end and to dissipate heat in the region of an opposite-lying end by means of a physical state change of the fluid that is enclosed in the heat pipe. The heat pipe comprises by way of example a low pressure in the interior in comparison to an atmospheric standard pressure of 1013 hectopascal, so that a boiling point and/or a dew-point of the enclosed fluid and thus a temperature working range of the heat pipe is fixed in dependence upon the low pressure.

In a preferred embodiment, the heat pipe comprises at least one fluid-filled tube. The fluid is by way of example water, ammonium, alcohol, in particular ethanol or isopropanol.

In a preferred embodiment, the heat conductor is connected in a heat conducting manner to the heat pipe on a longitudinal section of the heat pipe by means of a guide bushing, wherein the guide bushing is embodied to hold the heat pipe in place in a resilient and heat conducting manner in such a manner that the guide bushing can be moved back and forth along a longitudinal extension of the heat pipe. As a consequence, the heat conductor cannot rip or break in the region of a connection site to the heat pipe in the case of a heat expansion of the energy store.

In a different advantageous embodiment, the heat pipe is embodied in a planar manner. It is further preferred that the heat pipe comprises a cross-section, wherein a cross-section width is greater than a cross-section height. The heat pipe can therefore be arranged in a cuboid-shaped storage unit in an advantageously space-saving manner. It is preferred that a ratio of cross-sectional width to cross-sectional height of the cross-section of the heat pipe that is embodied in a planar manner amounts to 30 to 1. A cross-section height of the heat pipe that is embodied in a planar manner amounts by way of example to between 1 millimeter and 3 millimeters.

The storage unit is by way of example an intermediate circuit capacitor of an electrical drive of an electric vehicle. In a different embodiment, the storage unit is an intermediate circuit capacitor of a solar inverter.

BRIEF DESCRIPTION OF THE DRAWINGS

The invention is described hereinunder with reference to figures and further exemplary embodiments. Further advantageous variants of embodiments are evident from the features of the figures and the features described in the dependent claims.

DETAILED DESCRIPTION

Figure 1:
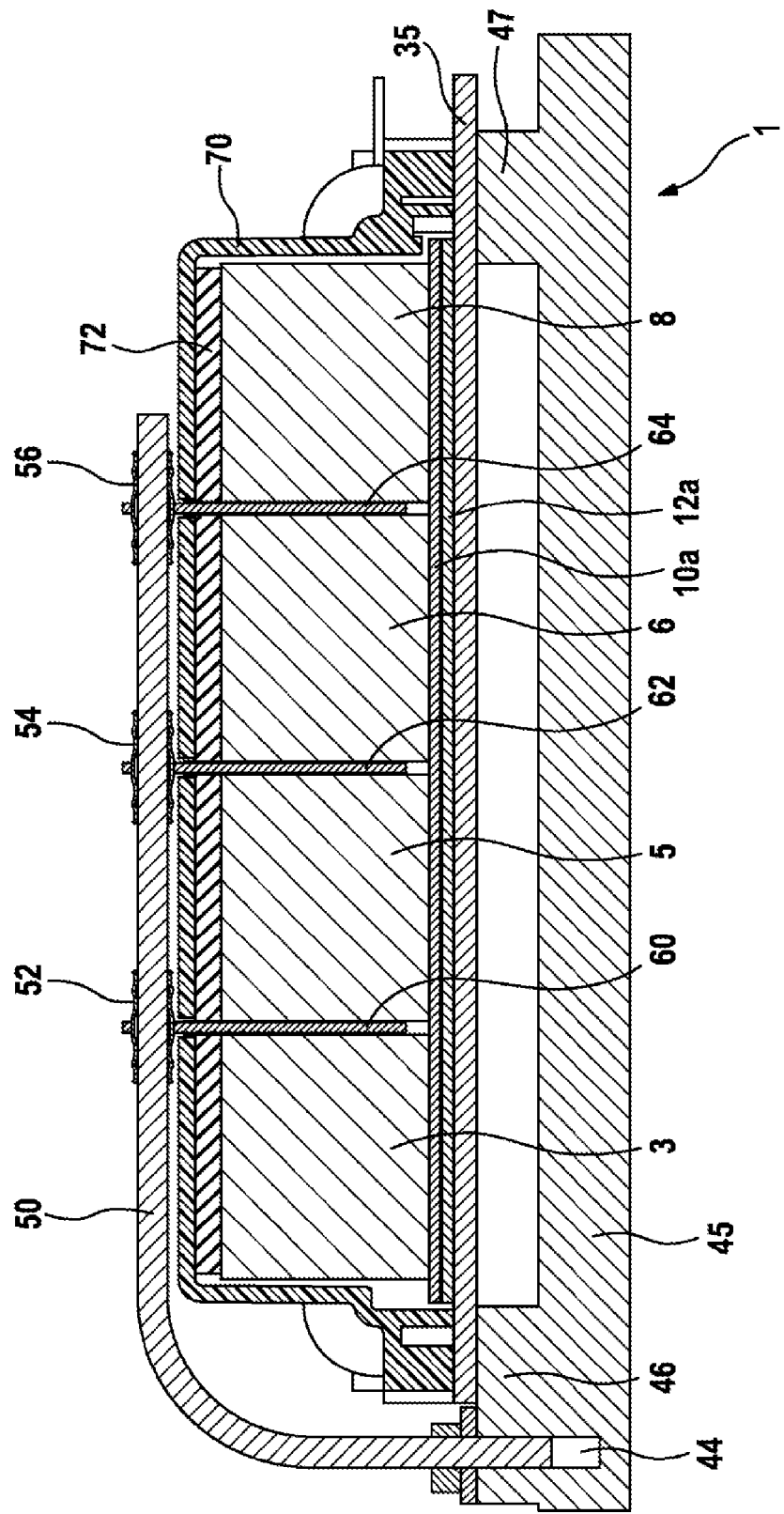
FIG. 1 illustrates a schematic view of an exemplary embodiment for a storage unit with a heat pipe.

FIG. 1 illustrates an exemplary embodiment for a storage unit 1. The storage unit 1 comprises an energy store 3, an energy store 5, an energy store 6 and an energy store 8. The energy stores 3, 5, 6 and 8 in this exemplary embodiment are in each case embodied as rolled-type capacitors. It is also feasible to embody the energy store as a battery.

The energy stores 3, 5, 6 and 8 are accommodated in each case along a longitudinal extension of the storage unit 1 in a type of channel or trough, wherein the channel is embodied by way of two contact rails. The contact rails are embodied in each case by means of an angled plate. The contact rails that embody the channel are further illustrated in FIG. 3 in a sectional view.

Figure 2:
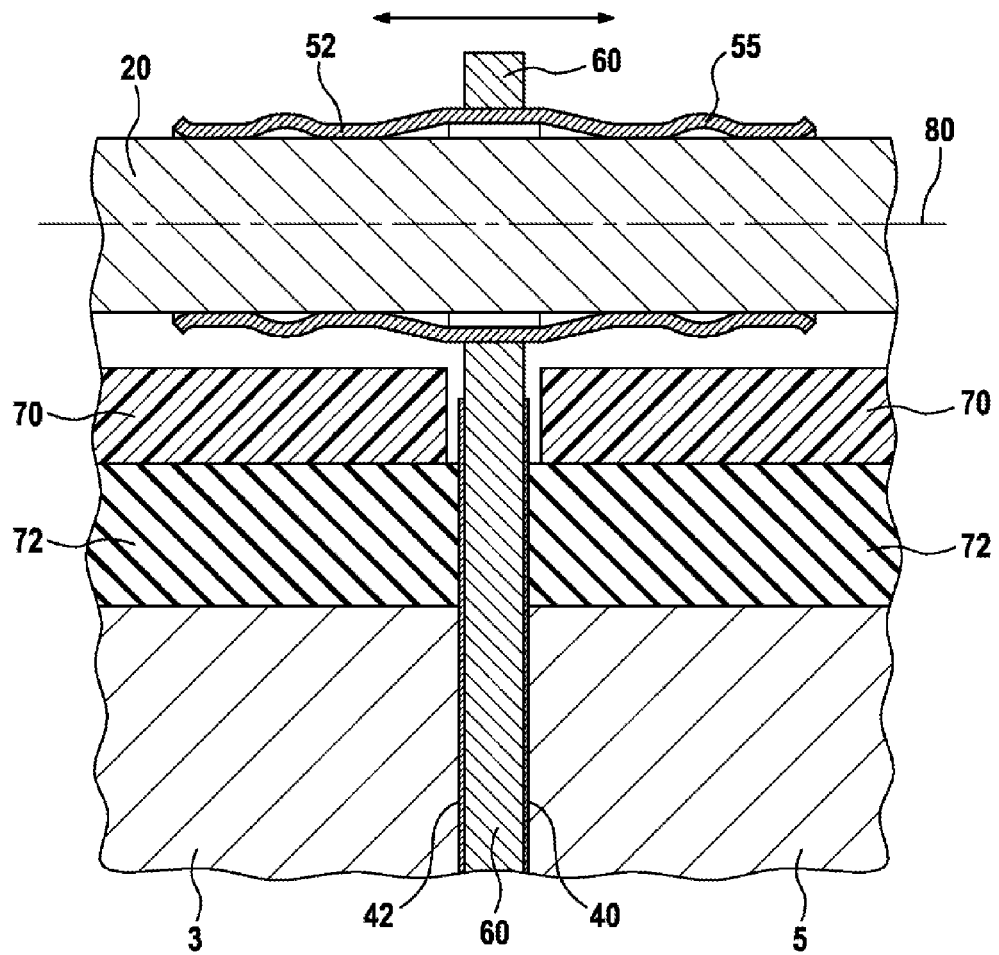
FIG. 2 illustrates a schematic view in detail of the connection of the heat pipe that is illustrated in FIG. 1 to the heat conductor by means of a guide bushing, in which guide bushing the heat pipe can be moved back and forth.

The energy store 3 is separated along a longitudinal extension of the storage unit 1 from the energy store 5 by way of an intermediate space. The energy store 5 is separated from the energy store 6 by way of an intermediate space and the energy store 6 is separated from the energy store 8 by way of an intermediate space. A heat conductor 60 is arranged in the intermediate space between the energy store 3 and 5. A heat conductor 62 is arranged in the intermediate space between the energy store 5 and the energy store 6 and a heat conductor 64 is arranged in the intermediate space between the energy store 6 and the energy store 8. The heat conductors 60, 62 and 64 are embodied, by way of example, by way of a heat conducting plate, in particular a copper plate. The heat conductors 60, 62 and 64 as is further illustrated in FIG. 2 are connected in each case to the contact areas of the energy store by means of an electrically insulating, heat conductive foil, which heat conductive foil is connected in a heat conducting manner to the heat conductor.

The angled sections 10a and 12a of the contact rails are illustrated in the sectional view in FIG. 1, which angled sections together embody a base for the previously mentioned channel. The contact rails are electrically insulated from one another in each case. A cooling element 35 is in thermal operative contact with the sections 10a and 12a of the contact rails, which cooling element contacts a surface in the section 12a in a heat conducting manner. The cooling element 35 in this exemplary embodiment is embodied by way of a heat conductive plate, in particular aluminum or copper plate. The cooling element 35 is connected in a heating conducting manner to a further cooling element 45 by way of a cooling ridge 47 and a cooling ridge 46.

The storage unit 1 also comprises a heat pipe 50. In this exemplary embodiment, the heat pipe 50 is embodied as a tube having a round cross-section. A heat pipe 50 with a planar, in particular rectangular cross-section is also feasible, in which a cross-sectional height is smaller than a cross-sectional width. The heat pipe 50 issues with an end into a cut-out 44 of the cooling element 45 in the region of the cooling ridge 46. The cooling ridges 46 and 47 are spaced apart from one another along a longitudinal extension of the storage unit 1. The heat pipe 50 is in thermal operative contact with the heat conductor 60 by way of a heat conductive guide bushing 52. The heat pipe 50 is also in thermal operative contact with the heat conductor 62 spaced apart along a longitudinal extension of the heat pipe 50 by the guide bushing 52. The heat pipe 50 is connected in a heat conducting manner to the heat conductor 64 spaced apart along a longitudinal extension from the guide bushing 54 by way of a guide bushing 56. The guide bushing 52 is further illustrated in FIG. 2. The guide bushings 52, 54 and 56 encompass the heat pipe 50 at least on a longitudinal section and hold said heat pipe in place on the longitudinal section in a resilient manner. The storage unit 1 also comprises a housing 70 that encompasses the energy stores 3, 5, 6 and 8. The housing 70 is embodied by way of example from a synthetic material. In this exemplary embodiment, a spring element 72 that is embodied in a planar manner, and for example by way of an expanded material, is arranged between a housing wall of the housing 70 and the energy stores 3, 5, 6 and 8. The housing wall of the housing 70, which housing wall in this exemplary embodiment is embodied in a curved manner, can press the energy stores against the heat conducting plate 35 by means of the spring element 72. The energy stores 3, 5, 6 and 8 are thus held in place in the housing 70.

Heat from the interior of a middle of the energy storing blocks that are joined together can be dissipated in each case by means of the heat conductors 60, 62 and 64 from a region of the energy stores 3, 5, 6 and 8, which region embodies a hot spot. For this purpose, the heat pipe 50 advantageously comprises substantially greater heat conducting properties than, for example, solid copper.

FIG. 2 illustrates the connection, already illustrated in FIG. 1, of the heat pipe 50 to the heat conductors 60, 62 and 64 using the example of the heat conductor 60. The heat pipe 20, which in this figure is illustrated in a longitudinal section, is in thermal operative contact in sections in the longitudinal direction with the guide bushing 52. For this purpose, the guide bushing 52 comprises a hollow cylindrical shape, wherein the longitudinal section of the heat pipe 50 is arranged in the lengthwise extending hollow space that is enclosed by the hollow cylinder. In this embodiment, the guide bushing 52 comprises at least one annular bead along its longitudinal extension, wherein the annular bead 55 is indicated in an exemplary manner. The annular bead 55 extends outwards in a radial manner. A longitudinal section that holds the heat pipe 50 in place in a resilient manner and contacts the longitudinal section of the guide bushing 52 in a heat conducting manner is connected to small bead along the longitudinal extension of the guide bushing 52.

The heat conductor 60 that in this exemplary embodiment is embodied as a heat conductive plate comprises an aperture in which the heat pipe 50 contacts the heat conductor 60 in a heat conducting manner at least on a longitudinal section in the region of the aperture by way of the guide bushing 52. The heat pipe 50 can thus receive heat from the heat conductor 60 in the region of the aperture, in particular from an interior wall of the aperture, by way of the guide bushing 52 and by way of the sites where the guide bushing 52 contacts the heat pipe 50. The heat pipe 50 is arranged in the guide bushing 52 along a longitudinal extension 80 of the heat pipe, in such a manner that said heat pipe can be moved back and forth. The heat pipe 50 can thus move in the guide bushings 52, 54 and 56 during the heat-related linear expansion of the energy stores 3, 5, 6 and 8. The heat conductors 60, 62 and 64 extend in a perpendicular direction with respect to the longitudinal extension 80 of the heat pipe 50.

The energy store 5 is connected to the heat conductor 60 by way of a heat conductive and electrically insulating layer, in this exemplary embodiment a polyimide layer. The energy store 3 is connected to the heat conductor 60 by way of a heat conductive and electrically insulating layer 42. Heat from the energy stores 3 and 5 can thus flow by way of the heat conductive insulation layers 40 and 42 into the heat conductor 60. The heat can flow onwards from the heat conductor 60 by way of the guide bushing 52 into the heat pipe 50. Also, in the case of a displacement of the guide bushing 52, which is connected to the heat conductor 60, along a longitudinal extension 80 of the heat pipe 50 the heat conductor 60 is not warped and/or bent back and forth, so that the heat conductor 60 in the region of the connection to the heat pipe 50 cannot break during heat-related elongation of the energy stores 3 and 5.

A thermal connection of the heat conductor 60 to the heat pipe 50 is also feasible with a junction that is embodied for example by way of soldering, welding or by way of heat shrinking. For this purpose, the heat pipe 50 by way of example is securely enclosed in an aperture of the heat conductor 60 by the heat conductor 60. For this purpose, the heat conductor 60 by way of example can be embodied from a resiliently embodied copper, in particular from a copper alloy.

For this purpose, it is preferred that the heat conductor comprises an admixture comprising chromium, silver, iron, titanium, silicon and for the most part copper.

It is preferred that the proportions of the admixture amount to 0.5% chromium, 0.1% silver, 0.08% iron, 0.06% titanium and 0.03% silicon. An electrical conductivity of the litz wire or the carded web preferably amounts to at least 40, preferably 46 megasiemens per meter.

The material of the heat conductor is by way of example a copper alloy in accordance with the US-Norm United Numbering System C18080.

Figure 3:
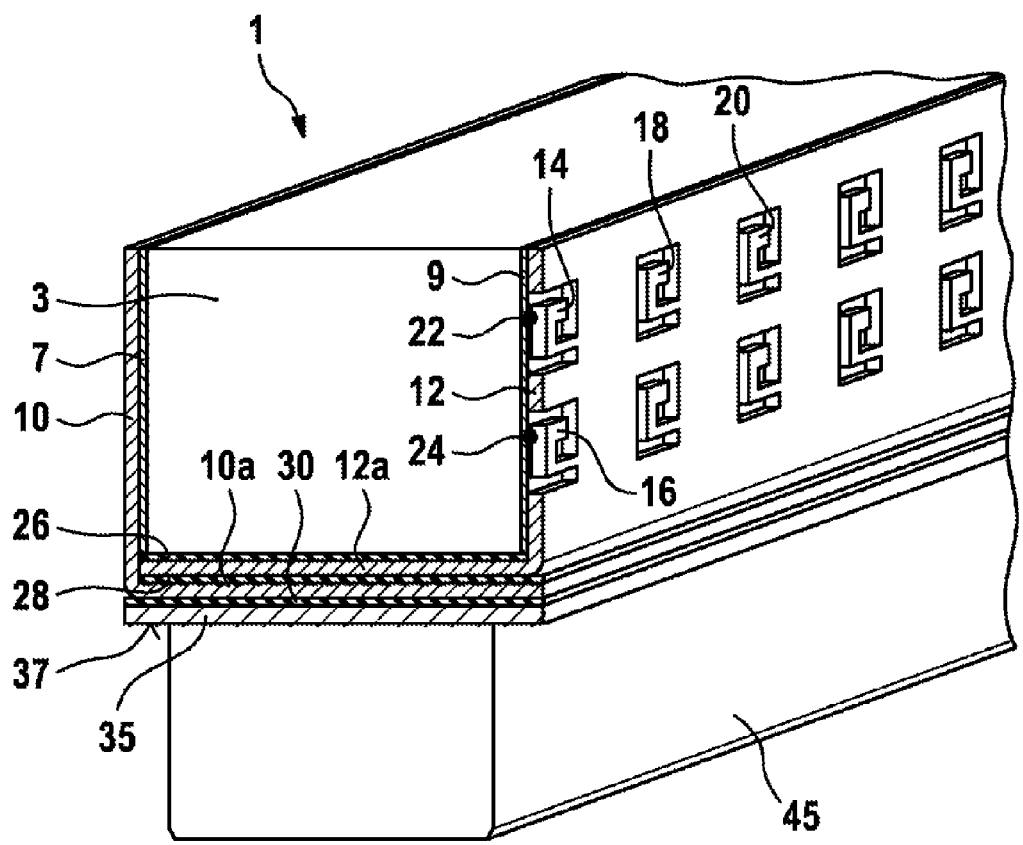
FIG. 3 illustrates a schematic view of an exemplary embodiment for the storage unit that is illustrated in FIG. 1 in a longitudinal section and partially illustrated in this figure, which storage unit is embodied to dissipate heat from an electrical connector of an energy store and to dissipate said heat to a support plate of the storage unit by way of a heat pipe that is operatively connected in a heat conductive manner to at least one hot spot of the energy store.

FIG. 3 illustrates a schematic view of an exemplary embodiment for a storage unit 1. The storage unit 1 comprises an energy store 3. The energy store 3 comprises a positive electrical connector 7 that is embodied in the form of an electrically conductive layer, in particular a metal layer. The metal layer is by way of example a Schoop layer, which is embodied, for example, by way of an alloy comprising copper and zinc. In a different embodiment or in addition thereto, the Schoop layer is embodied from aluminum.

The energy store 3 also comprises a negative electrical connector 9. The negative electrical connector 9 is embodied by way of a layer, in particular an electrically conductive metal layer, by way of example a Schoop layer. In this exemplary embodiment, the energy store 3 is embodied as a cuboid. The connectors 7 and 9 that are embodied by means of electrically conductive layers are embodied in each case in a planar, preferably end smooth manner and are arranged on the opposite lying end faces of the energy store. By way of example, a longitudinal axis extends between the end faces of the energy store 3, around which axis is wound a capacitor, in particular a rolled-type capacitor. The longitudinal axis consequently extends orthogonally with respect to the layers 7 and 9.

In this exemplary embodiment, the layer 9 that embodies the negative electrical connector of the energy store 3 is electrically connected to an L-shaped contact 14 by means of a welded connection, in particular a spot-welded connection 22. The figure also illustrates an L-shaped contact 16 that is electrically connected to the connector 9 by means of a spot-welded connection 24. The L-shaped contacts are embodied in each case by way of die cutting from a plate that embodies a contact rail 12. In this exemplary embodiment, the contacts 14 and 16 are formed as an integral part of the contact rail 12. The figure also illustrates further L-shaped contacts and the contacts 18 and 20 are indicated as an example of said L-shaped contacts. In the case of thermal expansion of the energy store, the L-shaped contacts are resilient in an advantageous manner in three dimensions, so that the contact cannot break away from the connector.

In this exemplary embodiment, the contact rail 12 is embodied by way of an angled plate, wherein in this exemplary embodiment an angled section 12a of the contact rail 12 extends in a perpendicular manner with respect to the section in which the contacts are embodied. The storage unit 1 also comprises a negative contact rail 10, which in a similar manner to the contact rail 12 is connected to an electrically conductive layer 7, wherein the electrically conductive layer 7 embodies the negative connector of the energy store 3. The layer 7 is by way of example embodied by way of a Schoop layer. The negative contact rail 10 in a similar manner to the positive contact rail 12 comprises an angled section 10a, which extends in a perpendicular manner to the section of the contact rail that is electrically connected to the electrical connector 7.

The contacts of the contact rails 10 and 12 that are connected in each case to the connector 7 and/or 9 extend in this exemplary embodiment in parallel to the connectors 7 and 9 that are embodied in layers and said contacts can by way of example contact said connectors. As a consequence, an additional electrically galvanized contact can be created, which in addition to the welded connections 22 and 24 electrically connects the connectors to the contact rails, in particular if the welded connection breaks.

In this exemplary embodiment, the angled sections 10a and 12a of the contact rails 10 and 12 are arranged in such a manner that they overlap one another, wherein the plate regions, which extend in each case in a planar manner, of the sections 10a and 12a overlap one another and therefore lie one on top of the other. An electrically insulating and heat conductive insulation layer 28 is arranged between the sections 10a and 12a.

The contact rails 10 and 12 thus embody a type of channel or trough, which at least partially receives the energy store 3, in this exemplary embodiment it completely receives said energy store. The plate sections of the contact rails 10 and 12 that extend in parallel to one another and in each case are connected to a connector of the energy store 3 embody in each case a channel or trough.

In this exemplary embodiment, the contact rails are embodied from plate that comprises a thickness between 0.5 and 2 millimeters. The storage unit comprises by way of example a length of 20 to 30 centimeters and a gap between the contact rails of between 3 and 5 centimeters. The section 10a or 12a embodies a base of the channel or trough, depending on which section lies on top of the other and therefore faces the energy store 3. In this exemplary embodiment, an electrically insulating layer 26 is arranged between the section, which embodies the base of the channel or trough, and the energy store 3.

The insulation layer 26 and/or 28 can by way of example be embodied by way of an adhesive foil, wherein the foil is a synthetic material foil that is coated on a surface region of the synthetic material foil with an adhesive.

The adhesive is by way of example an acrylic adhesive or a hot-melt adhesive.

In a different embodiment, the adhesive is a phase-change material, in particular having a matrix material comprising silicone or acrylic, which advantageously in each case cannot flow away during phase change. The matrix material—in particular in the case of the matrix material comprising silicone or acrylic—advantageously comprises at least one adhesive characteristic at room temperature, so that the contact rails can be placed against each other in an adhesive manner at room temperature by means of the phase-change material.

The phase-change material preferably comprises solid body particles. The solid body particles are preferably ceramic particles, in particular aluminum oxide particles, silicon oxide particles, silicon nitride particles, boron nitride particles or aluminum nitride particles or a combination of these. Advantageously, no air pockets arise between the contact rails or between the contact rail and the plate as a result of the phase-change material, as the phase-change material preferably comprises a phase-change temperature that is lower than the operating temperature of the storage unit. By way of example, the phase change temperature amounts to between 50 and 70 degrees Celsius. The solid body particles in each case preferably comprise good heat conductive properties, so that a heat conductor is embodied with said solid body particles and said heat conductor is integrated in the phase-change material as a matrix material.

The insulation layer is preferably a polyimide foil or a polyethylene foil. The thickness of the polyimide foil is preferably between 10 and 100 micrometers. The polyimide foil is preferably embodied to insulate an electrical voltage between 1000 and 4000 volts.

In this exemplary embodiment, the section 12a of the contact rail 12 embodies a base of the interior of the channel that is embodied by means of the contact rails 10 and 12, whereas the section 10a of the contact rails 10 embodies a part of the base that faces outwards with one surface. In this exemplary embodiment, the outwardly facing surface of the section 10a is connected to a heat conductive plate 35, in this exemplary embodiment to an aluminum plate. In this exemplary embodiment, the plate 35 embodies a cooling element, to which heat can be dissipated.

The heat that is generated in the energy store 3 can thus advantageously flow by way of the electrical connectors 7 and 9, onwards by way of the welded connections 22 and 24, by way of the L-shaped contacts 14 and 16, and onwards by way of the contact rails 12 to the angled region 12a of the contact rail 12, from there the heat flows onwards by way of the insulator 28 in the angled section 10a of the contact rails 10, which section together with the section 12a embodies the base of the channel that receives the energy store 3. The heat can flow from the angled section 10a onwards by way of a heat conductive electrical insulator 30, which insulator is embodied in this exemplary embodiment by way of an insulation layer, in particular an insulation foil, to the plate 35, which in this exemplary embodiment embodies a heat sink. The plate 35 comprises a surface region that embodies an outer surface 37 of the storage unit 1. In this exemplary embodiment, a cooling body 45 is connected in a heat conducting manner to the outer surface 37 of the plate 35, wherein the cooling body 45 by way of example comprises cooling fins that are spaced apart from one another and dissipate heat to an ambient air by means of convection. It is also feasible to have a heat exchanger that is embodied as a further cooling element for the purpose of guiding fluid.

What is claimed is:

1. A storage unit (1) for storing electrical energy comprising at least one energy store (3, 5, 6, 7) characterized in that the storage unit (1) comprises a contact area (37) for dissipating heat to a heat sink (45), and the storage unit (1) comprises at least one heat pipe (50) that is connected to the contact area (37) and connected to the at least one energy store (3, 5, 6, 8) in such a manner that heat losses that are generated inside the at least one energy store (3, 5, 6, 8) can be dissipated to the contact area (37) by way of the heat pipe (50), wherein the at least one energy store (3, 5, 6, 7) includes two energy stores (3, 5, 6, 8) that are arranged spaced apart from one another by way of an intermediate space and the heat pipe (50) is connected to the at least one energy store (3, 5, 6, 8) by way of at least one heat conductor (60, 62, 64), wherein the least one heat conductor (60, 62, 64) is arranged in the intermediate space and is in operative contact with the at least one energy store (3, 5, 6, 8), wherein the heat conductor (60, 62, 64) is connected in a heat conducting manner to the heat pipe (50) on a longitudinal section of the heat pipe (50) by means of a guide bushing (52, 54, 56), wherein the guide bushing (52, 54, 56) is configured to hold the heat pipe (50) in place in a resilient and heat conducting manner in such a manner that the heat pipe (50) is movable relative to guide bushing (52, 54, 56) back and forth along a longitudinal extension of the heat pipe (50).

2. The storage unit (1) as claimed in claim 1, characterized in that, at least one electrical connector (7, 9) of the at least one energy store (3, 5, 6, 8) is connected to an electrical contact rail (10, 12), wherein the contact rail (10, 12) is connected to at least one external connector of the storage unit (1) and the contact rail (10, 12) is connected to the contact area in a heat conducting manner.

3. The storage unit (1) as claimed in claim 1, characterized in that, the storage unit (1) comprises a heat conductive cooling element (35), which comprises an externally directed surface region (37) that embodies the contact area (37).

4. The storage unit (1) as claimed in claim 1, characterized in that, the at least one energy store (3, 5, 6, 8) is a capacitor.

5. The storage unit (1) as claimed in claim 1, characterized in that, the at least one energy store (3, 5, 6, 8) is a battery.

6. The storage unit (1) as claimed in claim 4, characterized in that, the at least one energy store (3, 5, 6, 8) is a rolled-type capacitor.

7. The storage unit (1) as claimed in claim 6, characterized in that, the rolled-type capacitor comprises an electrically conductive layer as an electrical connector (7, 9), which layer is connected to the contact rail (10, 12) in an electrical and heat conducting manner.

8. The storage unit (1) as claimed in claim 1, characterized in that the heat pipe (50) is embodied in a planar manner.

9. The storage unit (1) as claimed in claim 1, wherein the guide bushing (52, 54, 56) includes a hollow cylindrical shape, and wherein the heat pipe (50) extends through the guide bushing (52, 54, 56).

10. The storage unit (1) as claimed in claim 1, wherein the guide bushing (52, 54, 56) includes an annular bead (55) that extends outwardly in a radial direction.

11. The storage unit (1) as claimed in claim 1, wherein the heat conductor (60) extends at a transverse angle relative to the heat pipe (50) in a region of the guide busing (52, 54, 56).

12. The storage unit (1) as claimed in claim 1, wherein the storage unit (1) includes three guide bushings (52, 54, 56), and wherein the heat pipe (50) extends through each of the three guide bushings (52, 54, 56).

\* \* \* \* \*